May 7, 1940.  B. B. HOLMES  2,199,592
INFUSION APPARATUS
Filed Sept. 13, 1939
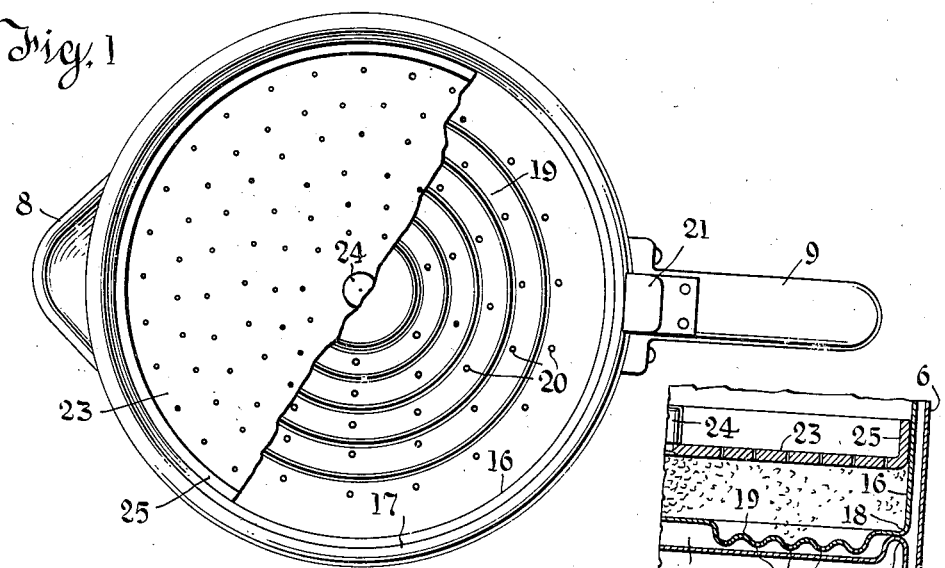
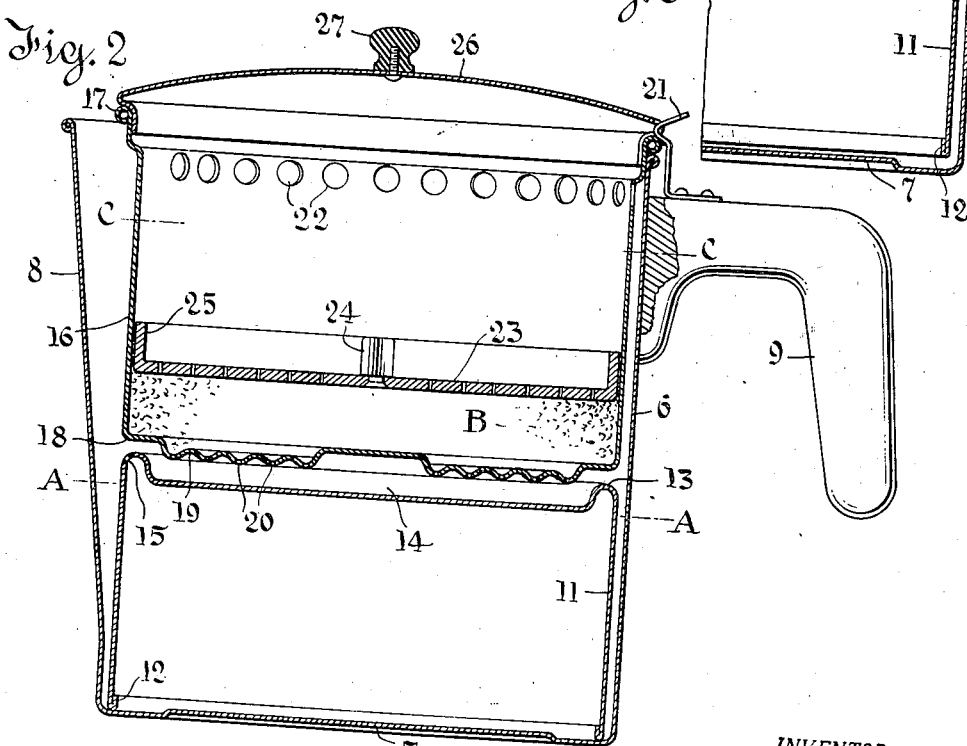
INVENTOR.
Bradford B. Holmes
BY
ATTORNEYS.

Patented May 7, 1940

2,199,592

UNITED STATES PATENT OFFICE 2,199,592

INFUSION APPARATUS

Bradford B. Holmes, New York, N. Y.

Application September 13, 1939, Serial No. 294,740

2 Claims. (Cl. 53—3)

This invention relates to domestic cooking vessels, and particularly to pots for making infusions of coffee.

In the past, four distinct methods of preparing coffee have been in common use. Ordinary boiled coffee is well-known, and is generally considered objectionable because boiling of the infusion impairs the flavor. The so-called "percolator" method, in which a flash steam pocket is used to return small quantities of the infusion above the filter bed is even more objectionable because the infusion is boiled and because inaccessible surfaces become coated with substances extracted from the coffee. These substances become rancid and sometimes burned and thus impair the flavor of the infusion.

For many years the French drip method was considered to produce the best coffee. According to this method, water, at a boiling temperature, is filtered by gravity through a bed of ground coffee, making usually a single pass to produce the desired infusion. Experts agree that this is one of the best ways to prepare coffee, but in the hands of the average user, the results are not uniform. A common cause of failure is the use of water which is not strictly at the boiling temperature. Furthermore, part of the water cools before it can all pass the filter, and the time afforded for infusion is not controllable because filtering flow starts as soon as the water is poured over the coffee, and there can be no definite time period that the water and the ground coffee are held in contact prior to the inception of the filtering step.

The fourth method which has come into extensive use in the last twenty years is the pressure vacuum transfer method making use of a heat resisting glass flask and a heat resisting glass funnel tube sealed together. This scheme allows control of the infusion time but is subject to definite objections. These pots filter rather slowly and many of them require the use of an objectionable filter cloth. The chief objection, however, is that if the pot be left on the stove after the water has been displaced upward into the funnel so as to extend the period of infusion, steam continues to pass upward through the water mixed with ground coffee and by imparting heat thereto keeps the water actively boiling. This has in a somewhat less marked degree the same harmful effect that is encountered in making boiled coffee. Such boiling can be prevented by removing the pot immediately from the stove once the water has risen, but the immediate descent of the infusion which results prevents the use of the optimum time for infusion. Moreover, the duration of the descent is affected by the fineness of grind of the coffee, for the reason that the coffee itself forms the principal filtering bed and the area of flow from the upper bell or container is limited to the relatively small area of the tubular neck. Obviously, this small area intensifies the effect of the fineness of grind on the time required for filtration.

The purpose of the present invention is to combine in a simple structure the best features of the drip process and the pressure vacuum infusion process while avoiding the defects characteristic of each. The features so combined are (1) gravity filtration on a filter bed of large area and relatively shallow depth (characteristic of the French drip method); (2) possible retention of boiling water on the coffee grounds for a definite period prior to the initiation of the filtering step (characteristic of the pressure-vacuum transfer system), and (3) assurance that the water delivered to the coffee grounds will be at boiling temperature (as is the case in the pressure-vacuum transfer system) and will not be boiled after it is delivered to the ground coffee (which is a feature characteristic of the French drip method). This gives the user control of factors which determine the final result to an extent not heretofore attained.

The device consists of three essential parts of very simple form: a pot so shaped that it is simple to manufacture and easy to keep absolutely clean, a steam bell of equally simple form, and a coffee container which is simply a cup-shaped member with an annularly corrugated bottom having perforations through the troughs of the corrugations.

It is preferred to use a retainer and water distributing plate which is simply a perforated flanged disk designed to overlie the coffee in the coffee container, but this can be omitted.

A cover for the complete assembly would ordinarily be provided, but has no functional significance.

The construction of the device is such that if extremely clear coffee is desired, a filter disc of cloth or paper or a very fine mesh screen material may be laid in the bottom of the coffee container, but since these expedients are well-known and do not affect the operation of the invention here described except as they perform a known filtering function, it is not deemed necessary to illustrate the optional use of these refinements.

In order that the importance of certain details in construction may be appreciated as the description proceeds, the general operative characteristics will be outlined. The pot is so constructed that water is brought to a boil in the lower half of the pot while the coffee grounds are held in the coffee container above the water level.

A steam bell functions to do two things: As soon as steam is generated, that is as soon as the water comes to a boil, the steam bell rises and acts as a valve to protect the coffee grounds from the upward passage of steam or water. The development of steam pressure within the bell functions to displace nearly all the water from the lower portion of the pot to entrance ports around the coffee container near the top thereof. So long as the water in the bottom of the pot is kept at a boil, the water in the coffee container can not descend and no steam generated can pass upward through the infusion then being made in the coffee container. However, the discharging steam does flow around and in contact with the periphery of the coffee container and without imparting much heat to the coffee container, serves as an isolating envelope which prevents loss of heat.

Thus, the time of infusion may be chosen at will without risk that the infusion while being made will either boil or fall appreciably below the boiling temperature.

When the heat is turned off, the condensation of steam beneath the bell permits the bell to descend and then the infusion filters through the coffee bed under gravity, exactly as it would in a French drip pot except that the infusion is certain to be just below the boiling point.

An important detail of construction is the provision of a depression in the top of the steam bell which keeps the discharge openings in the bottom of the coffee container slightly submerged in a bath of liquid infusion during the filtering operation. This detail assumes considerable importance near the end of the filtering operation for the reason that when the liquid head on the minute drain openings is of the order of 1/8th inch, a capillary or surface tension effect will inhibit flow unless the orifices are submerged. This detail thus permits more completed drainage of the filter than can otherwise be attained.

A preferred embodiment of the invention will now be described with reference to the accompanying drawing in which:

Figure 1 is a plan view of the pot with cover removed and with half of the distributor plate broken away to show the form of the bottom of the coffee container.

Figure 2 is a vertical axial section through the complete pot with the steam bell in its initial or lower position.

Figure 3 is a fragmentary view similar to a portion of Figure 2 but showing the steam bell in the upper position which it assumes after the generation of steam commences.

Referring particularly to Figures 1 and 2, the pot comprises a cylindrical shell 6 with a bottom which, if desired, may be recessed as indicated at 7, although a flat bottom may be used.

While any type of spout might be provided, I prefer simply to strike out a flaring spout from the side wall of the pot 6, as indicated at 8. This is shown diametrically opposite the handle 9 which is of insulating material and attached to the side wall of the pot in any suitable manner.

Positioned in the lower portion of the pot and occupying perhaps the lower 2/5 of its vertical extent is a steam bell 11. This is simply an inverted cup whose external diameter is about one-eighth inch less than the internal diameter of the pot. Te lower margin is preferably reinforced with a bead 12 and the closed top is dished to provide a peripheral rim 13 which encircles a depression or basin indicated at 14.

The rim 13 performs a valve function and the basin 14 retains a portion of the coffee infusion during the filtering operation, as will be explained.

Slightly below the crest of the rim 13 and outside the same is a minute vent port 15. It will be observed that the entire bell structure is simple in form, economical to manufacture and so accessible that it can be kept perfectly clean.

The coffee container 16 is a cylindrical, open-topped cup whose external diameter is approximately that of the bell 11 and whose upper end is beaded as indicated at 17 to define the position of the container in the pot and to stiffen the rim. The vertical dimension of the container is such that the peripheral shoulder 18 at its lower end is spaced a short distance above the rim 13 on the steam bell 11, when the steam bell rests on the bottom of the pot 6.

The bottom of the coffee container 16 is provided with a series of concentric annular corrugations 19 formed in a portion of the pot struck down from the plane of the shoulder 18. When the bell 11 rises and causes its rim 13 to seat on the shoulder 18, the corrugations 19 are received in the basin 14. When the bell settles, they are still slightly below the top of the rim 13. A series of minute perforations 20 are provided, preferably in the bottoms of the corrugations 19. One purpose of so locating the perforations is to permit the use of a disc of filter paper or a disc of cloth, or a fine mesh screen disc laid over the corrugations to perform a well-known auxiliary filtering function, in case the user desires this refinement. This is by no means necessary, and since the use of such filters is a common expedient, no filter is illustrated in the drawing. The use of a filter is no part of the claimed invention, but the invention does not exclude the use of a filter.

To prevent the coffee container 16 from floating upward when the hot water rises, some latching means must be provided and an ordinary spring detent is indicated at 21. This is shown mounted on top of handle 9 but any known means for latching or locking the cup 16 may be used.

Encircling the coffee container 16 near its upper margin is a series of relatively large perforations 22. These may completely encircle the coffee container, but I prefer to omit them opposite the spout 8. The perforations 22 are sufficiently large and sufficiently numerous to drain into the coffee container 16 all water which rises between the container and the pot 6 when the water boils. Otherwise the water would overflow the pot.

When no strainer disc is used in the bottom of the coffee container 16, it is desirable to prevent the water cascading through the perforations 22 from stirring up the ground coffee. Consequently, I use a perforated disc 23 which rests upon the coffee in the coffee container. It is provided with a knob 24 by which it may be lifted out, and a peripheral flange 25 of moderate height.

The purpose of this flange is to serve as an impositive retaining means for the disc 23. The coffee infusion may be poured from the pot without removing any of the parts and when this is done, the tilting of the pot may cause the disc 23 to cant slightly. Its cocking action causes the flange to lock the disc against further movement.

I prefer to provide a cover 26 with a knob 27. This is simply a flanged cover of familiar form. It is notched to clear the latch 21 as indicated in Figure 2.

To make coffee, the pot is filled with water to about the line A—A. The inverted bell 11 is then dropped into the pot and because the port 15 vents the air within the bell, the bell settles to the bottom of the pot, assuming the position shown in Figure 2.

The coffee container 16 is filled with suitably ground coffee as indicated at B. The coffee is leveled off and the disc 23 is placed upon its top. The container 16 is then inserted into the top of the pot and latched in position, as shown in Figure 2.

If a filter disc of any type is placed in the bottom of the coffee container 16 beneath the coffee, the disc 23 may be omitted because quiescence of the coffee grounds is not then important. Some users prefer the use of a filter disc and the omission of the overlying disc 23 because it then is practicable to stir the coffee while the infusion is being made.

The water in the pot is then brought to a boil. Shortly before the water boils, a small amount of occluded air will be driven off from the water and escape through port 15. When the generation of steam exceeds the capacity of port 15, the bell 11 will rise and the rim 13 will seat against shoulder 18 so that neither steam nor water can flow in any substantial quantity upward through the perforations 20 (see Figure 3). However, the steam trapped beneath the bell 11 displaces water from the bell and causes it to flow upward in the clearance between the bell 11 and the container 16 on the one hand, and the vertical wall of the pot 6. When the water reaches the perforations 22, it cascades through these perforations into the container 16 and is distributed by the perforated disc 23 evenly over the entire bed of coffee.

It will be observed that water will remain in the bottom of the pot to a depth of a fraction of an inch. All the rest of the water originally contained in the lower part of the pot is transferred to the container 16, the depth being indicated by the line C—C in Figure 2. So long as the water in the bottom of the pot is kept boiling the bell 11 will remain in its upper position. Consequently, no flow tends to occur from the coffee container 16. Thus the forming infusion remains in the container 16 and is kept hot, but not boiled, by steam flowing through the clearance between the pot wall and the wall of the container 16.

After an appropriate time interval, the pot is removed from the stove or the stove is turned off. The escape of steam through port 15 and condensation of steam beneath the bell 11 allow the bell to descend and immediately gravity draining of the infusion occurs. The basin 14 retains a bath of coffee infusion on the perforations 20 and thus insures complete gravity flow from the container 16 by inhibiting surface tension effects on the minute holes 20. While the device will operate without the submerging basin 14, tests have shown that this markedly assists complete drainage of the coffee container.

Satisfactory filtering can be attained by using perforations 20 of such size and number that the infusion will drain from the container 16 in about forty-five seconds. A cloth filter disc does not appreciably increase the filtering time. A paper filter disc requires about sixty seconds for the filtering operation. For the best result, the water is held just below the boiling temperature in contact with the grounds in container 16 for a period of about three minutes, but the duration of this step is subject to the complete control of the user, and the draining time either with or without filter discs is so short that the time of producing coffee compares favorably even with that of the glass coffee pots in which the filtering action is assisted by the vacuum effect.

The amount of coffee used and the nature of the grind and similar characteristics which are are often critical factors with other types of pot are much less important with the pot herein described. Tests have demonstrated that approximately uniform results can be had if the time duration of the infusion operation is standardized. The fineness of the grind of the coffee and, within limits, the quantity used have less effect than with other types of pot, in which the time of infusion is not controllable. This follows for the reason that the filter area is large, the depth of ground coffee is comparatively small in any event, and gravity filtration does not result in compacting the coffee grounds into a dense, relatively impermeable filter bed (such as is characteristic of the pressure-vacuum transfer method).

The quality of the coffee infusion prepared in pots of this type is uniform and excellent because the infusion is made practically at boiling temperature but under conditions which inhibit active boiling at any time. The duration of time within which infusion is made is under accurate control of the user. All parts of the pot are accessible and can easily be kept scrupulously clean.

Since the essential oils present in coffee infusions tend to coat the container and become rancid if allowed to remain, the accessibility of all parts of the pot and the ease with which it may be kept clean are vital considerations.

While the components described can be made of various materials, their simplicity and the ease of cleaning makes it possible to use metal without entailing the objectionable results heretofore encountered with metal pots.

While the invention has been described in considerable detail, the description and the illustration are exemplary and not limiting.

The scope of the invention will be defined solely in the claims.

What is claimed is:

1. In a device for preparing hot infusions of coffee, the combination of a pot dimensioned to contain in its lower portion the entire charge of water to be boiled; a removable coffee container of somewhat smaller horizontal dimension than said pot for containing a charge of coffee and provided with lateral water inlet ports near its top and with bottom straining perforations distributed over substantially the entire bottom except a marginal encircling sealing area; releasable means for retaining said container in the upper portion of the pot with the bottom of the container above the level of said water charge; and means comprising a bell substantially submerged in said charge in the pot, for displacing the major portion of said water upward around the bell and between the container and the walls of the pot to said inlet ports upon the generation of steam from the water charge, said bell being free to float upward and having a marginal portion which then engages said sealing area to inhibit flow upward through said straining perforations while steam is being generated, whereby escaping steam is caused to flow around said container, said bell having a constantly open restricted vent.

2. The combination defined in claim 1 in which the top of the bell is dished to form a basin within a peripheral sealing rim which engages the shoulder in the container, and the straining perforations are in a portion of the container bottom sufficiently below the marginal sealing area thereof to be submerged in liquid retained by said basin even when the bell descends to its lower position.

BRADFORD B. HOLMES.